Oct. 31, 1967 V. P. BRAUN ETAL 3,349,673

LAUNDRY LISTING AND MARKING

Filed March 9, 1965 15 Sheets-Sheet 1

INVENTOR.
PHILIP N. BRAUN
VINCENT P. BRAUN
THOMAS PATELL

D. Emmett Thompson
ATTORNEY.

LAUNDRY LISTING AND MARKING

Filed March 9, 1965 15 Sheets-Sheet 2

INVENTORS
PHILIP N. BRAUN
VINCENT P. BRAUN
THOMAS PATELL
BY D. Emmett Thompson
ATTORNEY.

INVENTORS
PHILIP N. BRAUN
VINCENT P. BRAUN
THOMAS PATELL
BY D. Emmett Thomason
ATTORNEY.

Oct. 31, 1967 V. P. BRAUN ETAL 3,349,673

LAUNDRY LISTING AND MARKING

Filed March 9, 1965 15 Sheets-Sheet 4

INVENTORS
PHILIP N. BRAUN
VINCENT P. BRAUN
THOMAS PATELL

BY D. Emmett Thompson
ATTORNEY

LAUNDRY LISTING AND MARKING

Filed March 9, 1965

15 Sheets-Sheet 5

INVENTORS
PHILIP N. BRAUN
VINCENT P. BRAUN
THOMAS PATELL
BY D. Emmett Thompson
ATTORNEY.

LAUNDRY LISTING AND MARKING

Filed March 9, 1965 15 Sheets-Sheet 6

INVENTORS
PHILIP N. BRAUN
VINCENT P. BRAUN
THOMAS PATELL
D. Emmett Thompson
ATTORNEY.

LAUNDRY LISTING AND MARKING

Filed March 9, 1965

INVENTORS
PHILIP N. BRAUN
VINCENT P. BRAUN
THOMAS PATELL
D. Emmett Thompson
ATTORNEY.

INVENTORS
PHILIP N. BRAUN
VINCENT P. BRAUN
THOMAS PATELL

D. Emmett Thompson
ATTORNEY.

INVENTORS
PHILIP N. BRAUN
VINCENT P. BRAUN
THOMAS PATELL
D. Emmett Thompson
ATTORNEY.

INVENTORS.
PHILIP N. BRAUN
VINCENT P. BRAUN
THOMAS PATELL
D. Emmett Thompson
ATTORNEY

LAUNDRY LISTING AND MARKING

Filed March 9, 1965

INVENTORS.
PHILIP N. BRAUN
VINCENT P. BRAUN
THOMAS PATELL
BY D. Emmett Thompson
ATTORNEY.

LAUNDRY LISTING AND MARKING

Filed March 9, 1965

INVENTORS.
PHILIP N. BRAUN
VINCENT P. BRAUN
THOMAS PATELL
D. Emmett Thompson
ATTORNEY.

FIG. 41
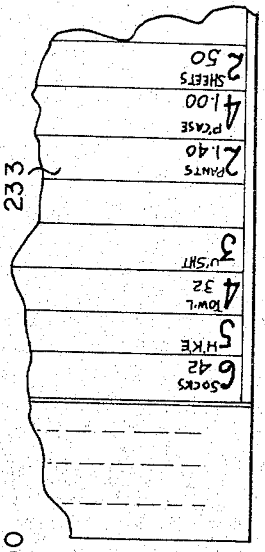
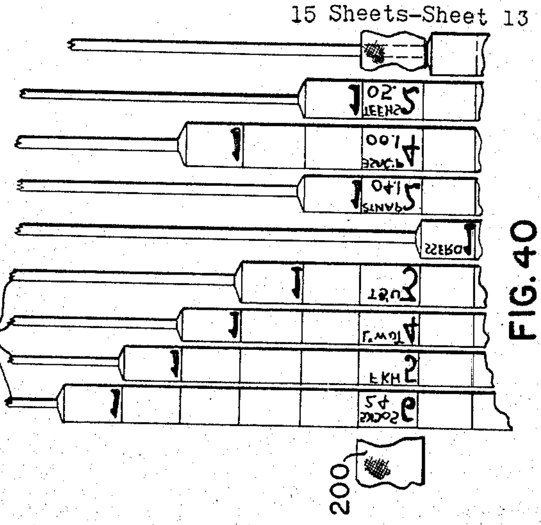
FIG. 40
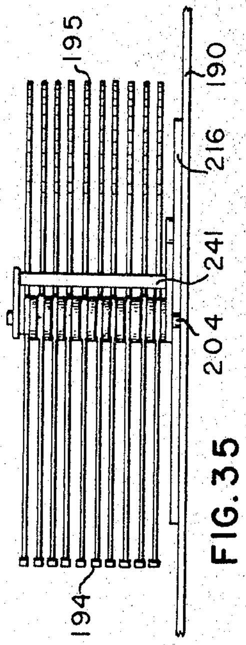
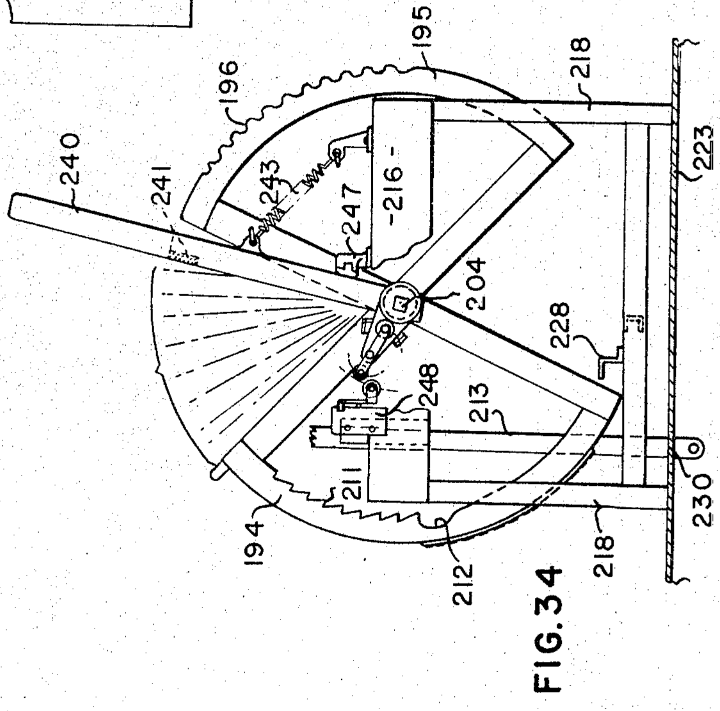
FIG. 35, FIG. 34
INVENTORS
PHILIP N. BRAUN
VINCENT P. BRAUN
THOMAS PATELL
D. Emmett Thompson
ATTORNEY.

INVENTORS.
PHILIP N. BRAUN
VINCENT P. BRAUN
THOMAS PATELL
D. Emmett Thompson
ATTORNEY.

Oct. 31, 1967 V. P. BRAUN ETAL 3,349,673

LAUNDRY LISTING AND MARKING

Filed March 9, 1965 15 Sheets-Sheet 15

INVENTORS.
PHILIP N. BRAUN
VINCENT P. BRAUN
THOMAS PATELL

D. Emmett Thompson

ATTORNEY.

United States Patent Office 3,349,673
Patented Oct. 31, 1967

3,349,673

LAUNDRY LISTING AND MARKING

Vincent P. Braun, Thomas Patell, and Philip N. Braun, Syracuse, N.Y., assignors to Tag-O-Matic Machine Co., Inc., Syracuse, N.Y., a corporation of New York Filed Mar. 9, 1965, Ser. No. 438,342
15 Claims. (Cl. 93—88)

This invention has to do with a system for listing and marking articles in a bundle of laundry.

The invention has as an object the combination of a listing and marking machine interconnected and interlocked in such manner as to require the operator to perform a series of operations in a predetermined sequence, the listing and marking machines being operable in a manner to avoid erroneous listing and marking.

The invention has as a further object a listing machine embodying a structural arrangement, economical to construct, and which is particularly durable and error proof in operation.

The invention has as a further object a marking machine having a particularly efficient mechanism for automatically advancing the bundle number type wheel when the articles in a bundle have been listed and marked.

The invention consists in the novel features and in the combinations and constructions hereinafter set forth and claimed.

In describing this invention, reference is made to the accompanying drawings in which like characters designate corresponding parts in all the views.

In the drawings:

FIGURE 34 is a view looking to the right, FIGURE 21, with the side of the casing removed and with parts omitted.

FIGURE 35 is a top plan view of the structure shown in FIGURE 34.

FIGURE 40 is a face view of the print type wheels on the listing machine indicating a typical listing at the print line.

FIGURE 41 is a fragmentary view of the invoice showing the listing printed thereon.

Figures 1, 42, 43, 44:
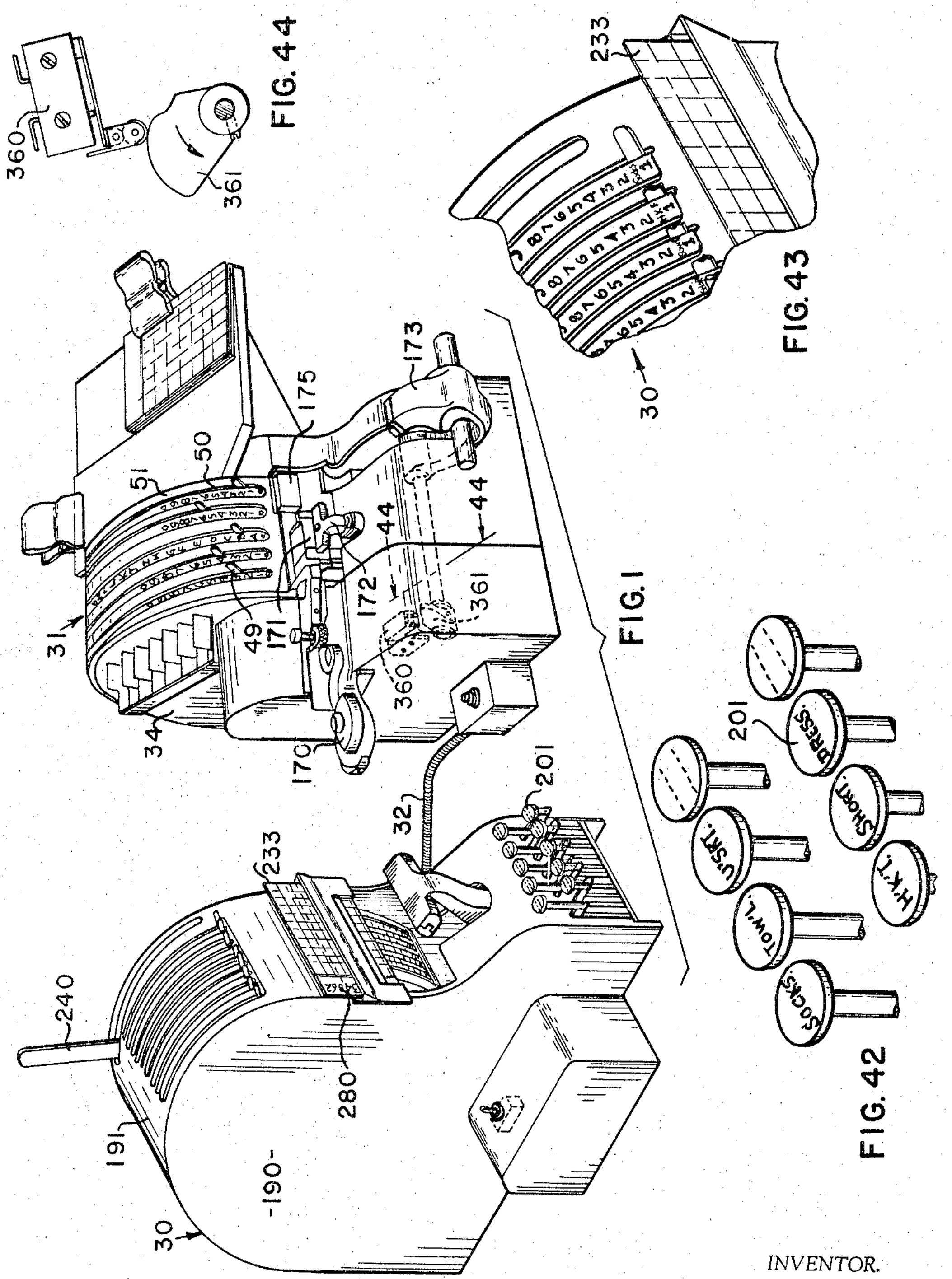
FIGURE 1 is a view showing the listing machine and the marking machine in perspective.
FIGURE 42 is an enlarged perspective view of the operating keys on the listing machine.
FIGURE 43 is an enlarged fragmentary view of the central portion of the front of the listing machine.
FIGURE 44 is a sectional view taken on lines 44—44, FIGURE 1.

Referring to FIGURE 1, the listing machine is indicated generally as at 30, and the marking machine at 31. These machines are interconnected by a cable 32 forming part of the interlock arrangement.

Figures 2, 12, 17:
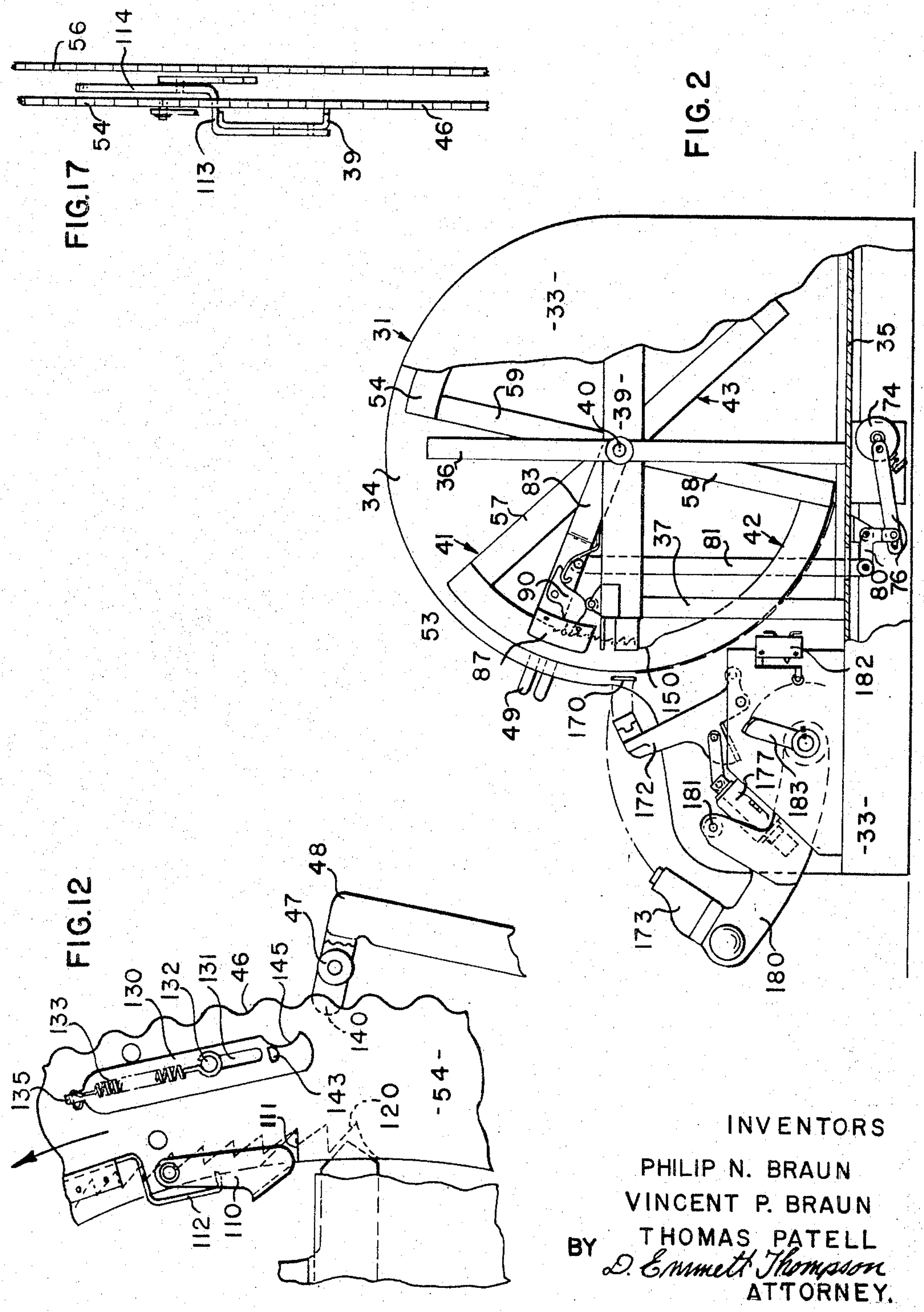
FIGURE 2 is a view of the marking machine looking to the left in FIGURE 1 with parts broken away and parts in section.
FIGURE 12 is a fragmentary view showing the first type wheel returning to initial position.
FIGURE 17 is a view taken on line 17—17, FIGURE 14.
Figures 5, 6, 7:
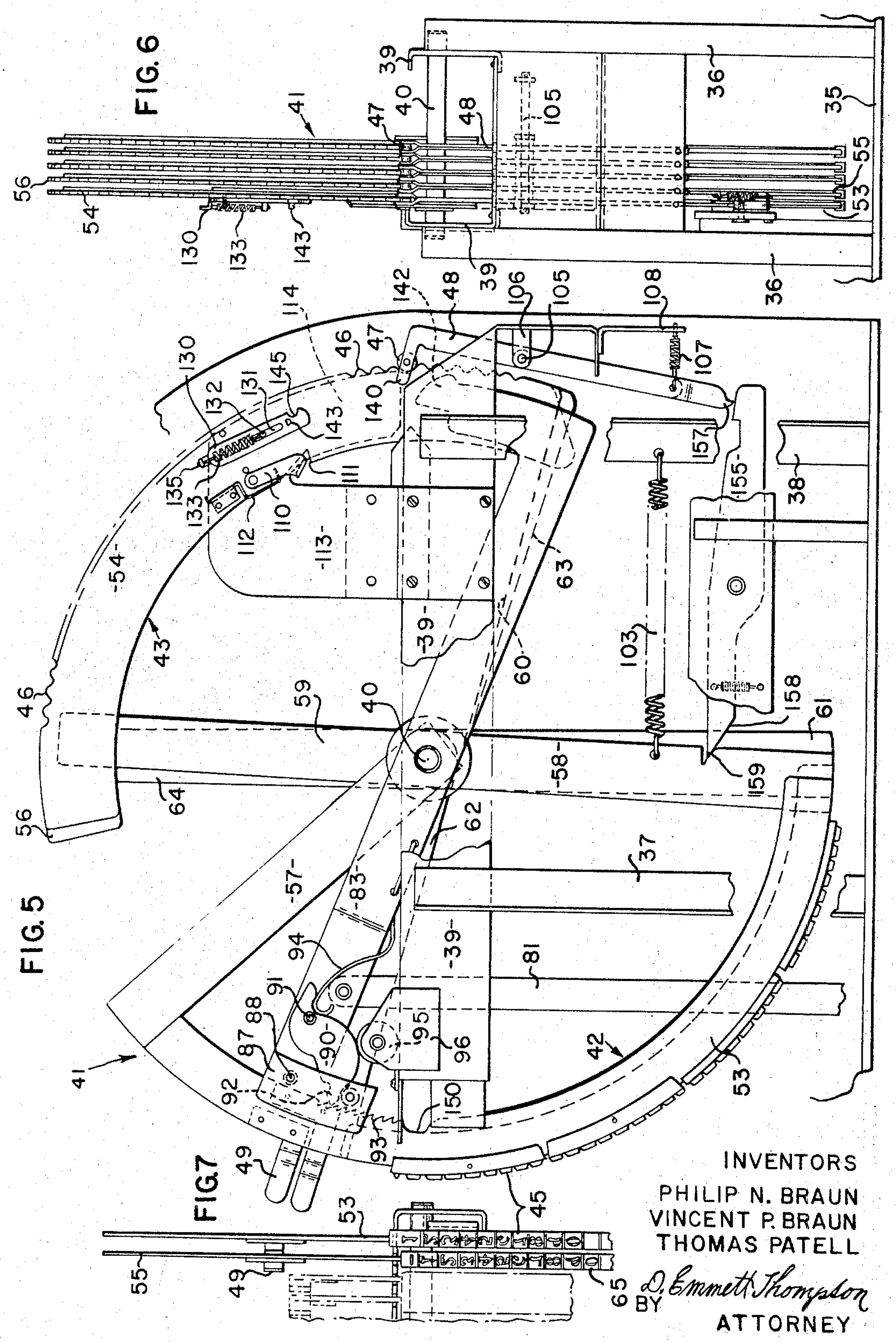
FIGURE 5 is an enlarged side elevational view of the print type wheel unit of the marking machine showing the first bundle number print type wheel in normal position and second type wheel advanced one step.
FIGURE 6 is a rear elevational view of the print type wheel unit looking to the left in FIGURE 5 with the casing of the machine removed.
FIGURE 7 is a fragmentary front elevational view looking to the right, FIGURE 5, of the bundle print type wheels, both in normal position.

The marking machine is formed with two side plates 33, 34, and a base plate 35 is fixedly secured between the side plates 33, 34, and spaced upwardly from the lower edges thereof. A pair of posts 36 are fixedly secured to the plate 35 and extend upwardly therefrom. The posts 36, FIGURES 2 and 6, are positioned at the central portion of the machine, and there are front and rear posts 37, 38, see FIGURE 5, attached to cross members 39, the cross members 39 being also affixed to the posts 36. A shaft 40 is mounted in the cross members 39 at the upper ends of the posts 36. A plurality of type wheels, indicated generally at 41, are rotatably mounted on the shaft 40. These type wheels each consist of arcuate segments designated generally 42, 43. The segments 42 carry print type indicated at 45. The segments 43 are formed on their periphery with notches 46 engaged by a roller 47 mounted on the upper bifurcated end of a detent member 48.

Figures 8, 9, 10:
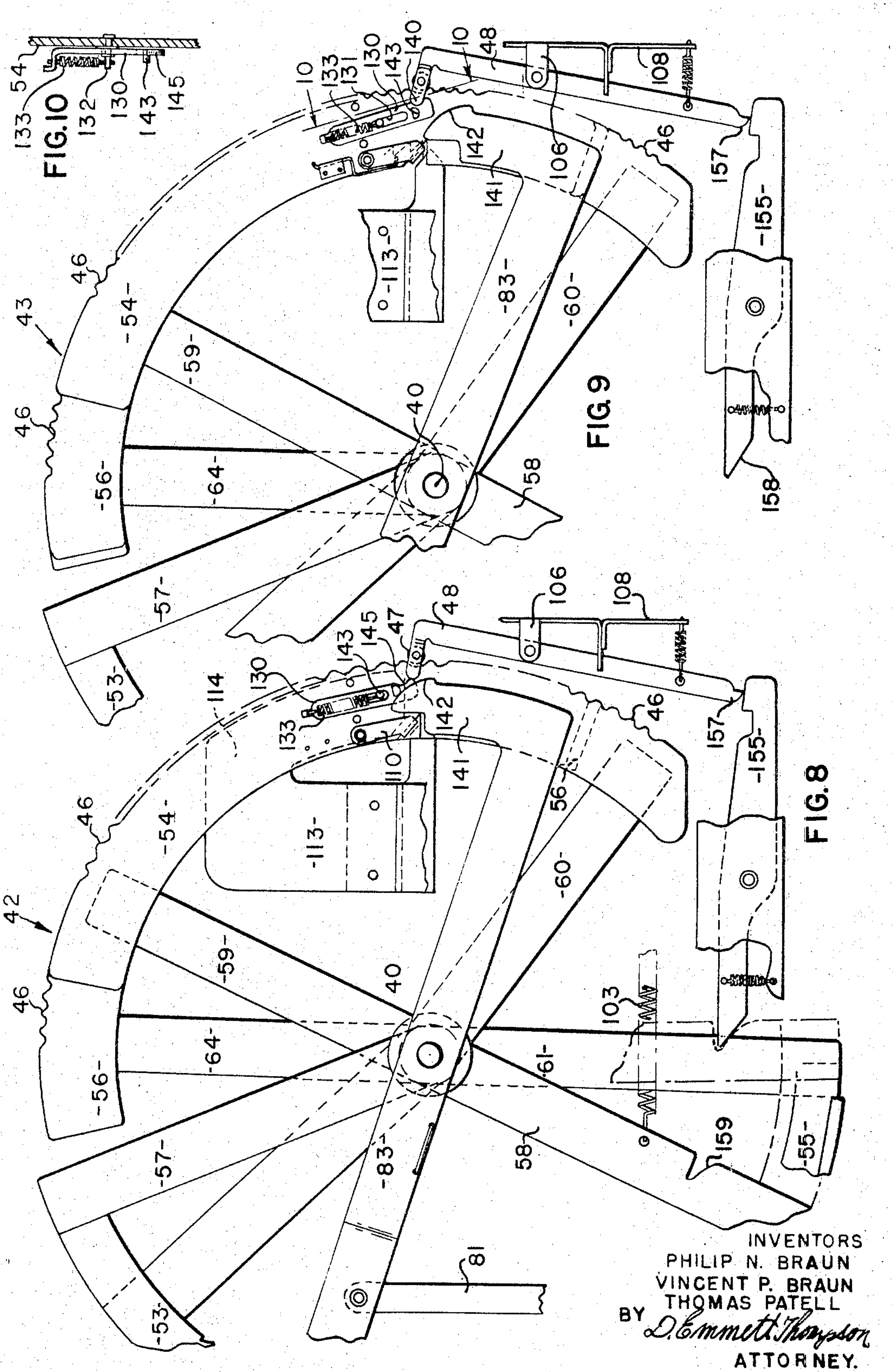
FIGURE 8 is a view similar to FIGURE 5, with portions omitted, illustrating the ninth actuation of the actuator for the first bundle number type wheel, the wheel being advanced to the tenth position.
FIGURE 9 is a view similar to FIGURE 8 showing the actuator for the first bundle number type wheel returned to initial position.
FIGURE 10 is a view taken on line 10—10, FIGURE 9.

The type wheels are indexed or moved step by step in a clockwise direction, FIGURES 5, 8 and 9. The segment 42 of each type wheel is provided with a handle 49 extending outwardly through a slot 50 formed in the arcuate cover member 51, see FIGURE 1. The cover member 51 is provided with letters and numerals adjacent each of the slots 50 to indicate the position of each type wheel as the handle thereof is moved in juxtaposition to the letter or numeral on the cover. The type wheel, at the right side of the machine, FIGURE 1, and the next adjacent type wheel, are provided with type indicating the number of the bundle of laundry being listed and marked.

In reference to FIGURES 5, 8, 9 and 11, the type carrying segment of the first bundle number type wheel is indicated at 53, and the detent segment for that wheel is indicated at 54. The type segment for the next adjacent bundle number print wheel is indicated at 55, FIGURE 8, and the detent segment for that wheel at 56. The type segment 53 is supported by radial arms 57, 58. The detent segment 54 is carried by arms 59, 60. The type segment 55 of the next adjacent bundle number wheel is carried by arms 61, 62. The detent segment 56 is carried by arms 63, 64.

Referring to FIGURE 7, the bundle number print type wheel segment 53 is arranged so that numeral 1 is position at the print line when the first wheel is in normal or return position. The print type 65 on segment 55 of the second print wheel is arranged so that the numeral 1 is immediately below the print line. In other words, when the second print wheel is advanced one step or increment, the numeral 1 is positioned at the print line. The print type 45 on segment 53 contains the numerals 1 to 0. The first print wheel is indexed, or advanced, one increment for each bundle. That is, the first bundle will bear No. 1, the second No. 2, etc. When this first print wheel has been actuated ten times, the zero is positioned at the print line and the second print wheel has been advanced to bring the numeral 1 to the print line for indicating bundle No. 10. After marking bundle No. 10, the first print wheel is returned to normal position so that the identification tag for the next bundle will be printed 11, and the first type wheel is again advanced one increment for each succeeding bundle. When the first wheel has been advanced nine actuations, the second type wheel is again advanced one increment, all whereby the first and second bundle number print wheels will indicate up to ninety-nine bundles.

Figure 4:
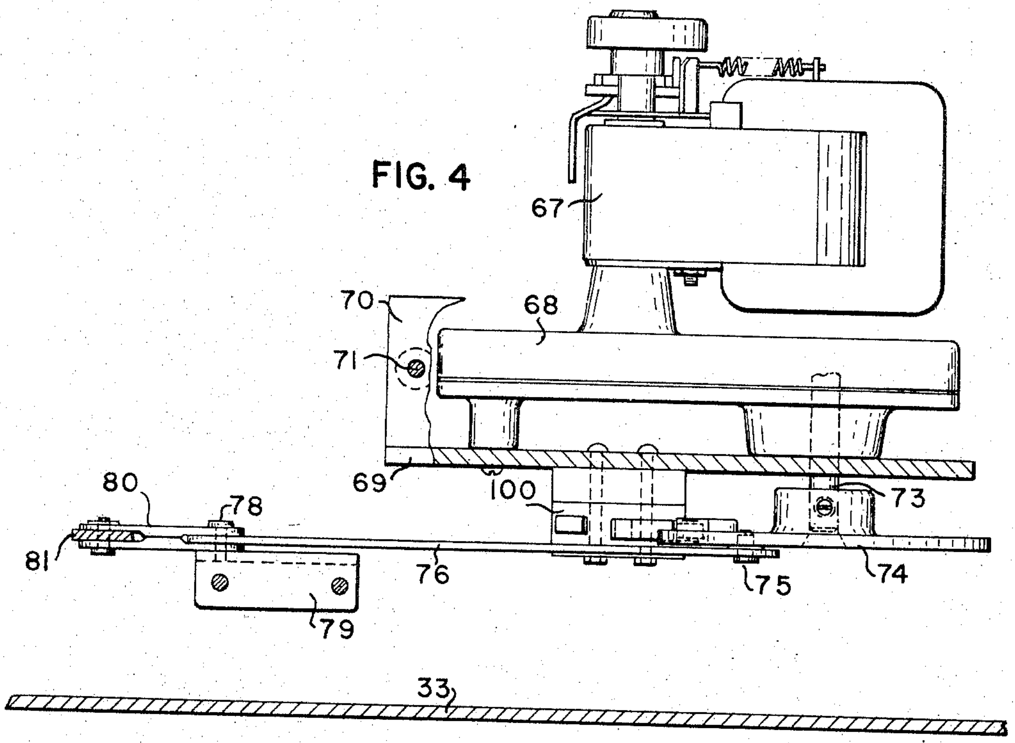
FIGURE 4 is a view taken on line 4—4, FIGURE 3.
Figure 3:
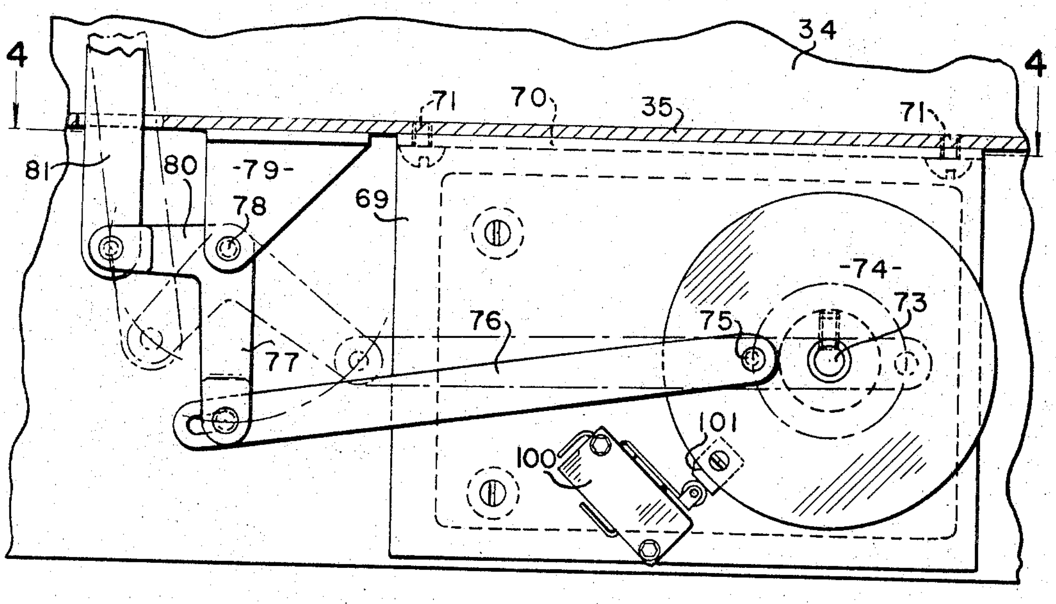
FIGURE 3 is an enlarged view of the actuator for the first type wheel shown in the lower portion of FIGURE 2.

The first print wheel is actuated by power means consisting of a motor 67, FIGURE 4, connected to a transmission in housing 68 attached to a plate 69 having at its upper edge a bent over flange 70, which is attached to the plate 35, as by screws 71. The output shaft 73 of the transmission is provided with a crank disk 74 having a crank pin 75. A link 76 is connected at one end to the pin, and at its opposite end to leg 77 of an angle lever pivoted at 78 to a bracket 79 also attached to the plate 35. The leg 80 of the angle lever is pivotally connected to a vertically disposed link 81, the upper end of which is pivotally connected to a lever 83 journalled on the shaft 40, FIGURES 5 and 8. The forwardly extending portion of the lever 83 overlies the inner surface of the type quadrant 53. A plate 87 is fixed to the lever 83 by rivets 88 and spaced outwardly from the lever, so that the plate 87 is positioned on the outer surface of the segment 53. A pawl 90 is pivoted at 91 to lever 83 and has a tooth 92 for engaging teeth 93 formed on the inner surface of the segment 53, see FIGURE 5. The pawl 90 is yieldingly urged in a counter-clockwise direction by spring 94 about pin 91 into engagement with a roller 95 journalled in a bracket 96 fixed to cross member 39. The arrangement is such that upon rotation of the crank disk 74, from the position shown in FIGURE 3, the link 81 is moved downwardly, and this movement, in conjunction with roller 95, effects a clockwise rotation of the cam 90 about the pivot 91, moving the cam tooth 92 into engagement with a tooth 93 on segment 53 to effect clockwise movement of the segment, and likewise segment 54. The stroke imparted to the link 81, in conjunction with the movement of the pawl 90, is such that upon downward movement of the link 81, the segments 53, 54, are advanced one increment—that is, print type for numeral 2 is moved up to the print line. In the combination shown, the motor 67 is energized upon the printing of the list of articles in the bundle by the listing machine 30, as will be hereinafter explained.

When the motor 67 is energized, the crank disk is rotated one revolution. The circuit to the motor is opened by switch 400 operated by projection 401 fixed to the cam disk 74.

The number 1 bundle number wheel with segments 53, 54, is urged to normal position by a tension spring 103, one end of which is attached to the segment brace 58, and the opposite end to the post 38, see FIGURE 5. The detent 48 is pivoted at 105 to a bracket 106 fixed to the cross member 39. The detent roller 47 is urged into the notches 46 of segment 54 by tension spring 107 connected to the lower end of the detent 48, and a bracket 108 fixed to the bracket 106. The engagement of the detent roller 47 in notches 46 is sufficient to prevent movement of the segments 53, 54, under the influence of spring 103.

As previously stated, when the segment 53 is in normal position, the print numeral 1 carried thereby is positioned at the print line. Accordingly, the first bundle number print wheel is not moved during the listing and marking in of the first bundle of laundry. At the conclusion of listing and marking the first bundle, the first actuation is imparted to the pawl 90, whereupon the numeral 2 of the first print wheel is moved to the print line position. When the eighth actuation is imparted to the pawl 90, the numeral 9 on the first print wheel is moved to the print line position and upon the ninth actuation of the pawl, the zero type is moved to the print line position and it is then necessary that the second type wheel be advanced one step to bring the numeral 1 to the print line position to print the numeral 10. At the conclusion of the listing and marking of the articles in a bundle of laundry, the list is printed on the invoice, as will be hereinafer explained. This printing operation energizes motor 67 to effect advancement of the first type wheel to bring the next numeral to the print line.

Figures 13, 14, 15, 16:
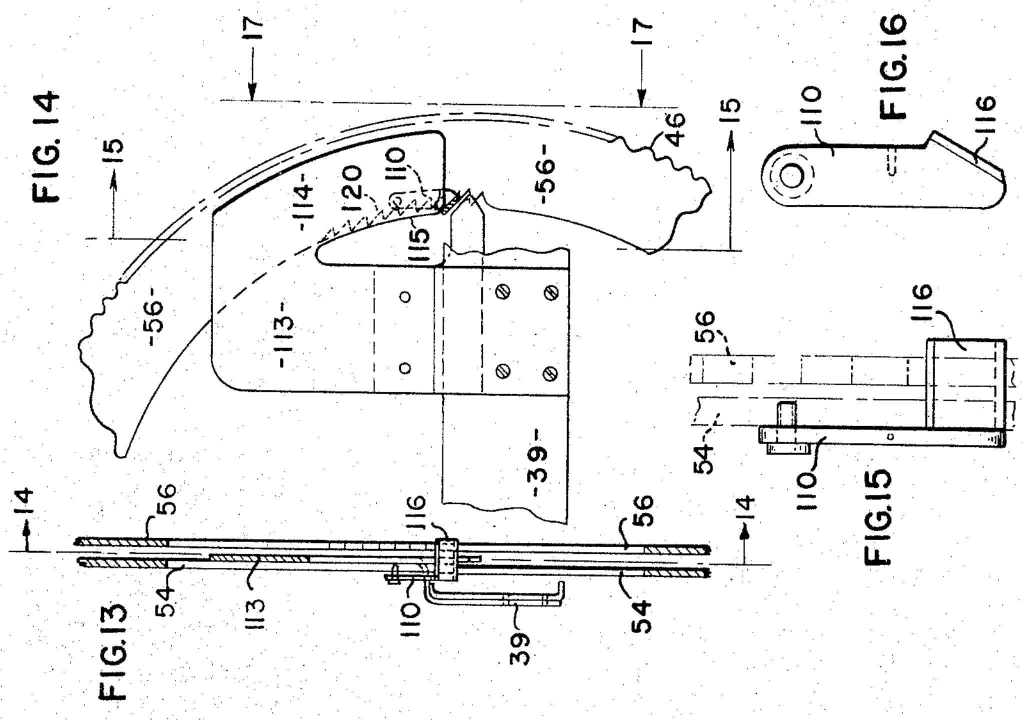
FIGURE 13 is a sectional view taken on line 13—13, FIGURE 11.
FIGURE 14 is a view taken on line 14—14, FIGURE 13.
FIGURE 15 is a view of the second type wheel pickup pawl; the view being taken in a direction indicated by the lines 15—15, FIGURE 14.
FIGURE 16 is a side elevational view of the pawl shown in FIGURE 15 looking to the left thereof.

A latch 110 is pivotally mounted to the detent segment 54 of the first bundle number print wheel, see FIGURES 5, 8, 9, and 11. The inner edge surface of the detent segment 54 is formed with a notch 111, and the latch 110 is urged into this notch by a spring 112. There is a cam member 113 fixed to the cross piece 39 and has a portion 114 positioned on the inner side of the segment 54. The portion 114 is of arcuate form, see FIGURE 14, and the inner edge 115 thereof extends in close adjacency to the inner edge of the segment 54. The latch 110, see FIGURE 15, has a tail piece 116 which extends inwardly and across the inner edges of the segments 54, 56. The segment 56 of the second bundle number type wheel is formed with a plurality of ratchet teeth 120, see FIGURE 14. The inner edge surface 115 of the cam portion 114 serves to guide the tail piece 116 of latch 110 so that it cannot enter the notch 111 in segment 54. When the first type wheel has been advanced eight times preparatory to the marking of the ninth bundle, the tail piece 116 of latch 110 is moved below the cam portion 114, whereby the tail piece 116 of the latch is moved into the notch 111 of segment 54 by spring 112, and also into engagement with one of the ratchet teeth 120 of segment 56, see FIGURE 8. This operation positions numeral 9 on the first bundle type print wheel at the print line.

A detent latch 130 is also mounted on the outer surface of the segment 54. This latch is formed with a lengthwise extending slot 131 to receive the mounting pin 132. The latch is urged downwardly, as shown in FIGURE 5, by tension spring 133, one end of which is attached to the pin 132, and the opposite end to a bent up ear 135 on the latch.

When the lever 83 has been actuated the eighth time for the marking of bundle No. 9, the lower end of the floating latch 130 is in juxtaposition to the inner end 140 of the detent 48. The rearwardly extending portion of the lever 83 is formed with an upwardly extending portion 141 having an acruate cam surface 142. The latch 131 is provided in its lower portion with a projection pin 143.

Upon the ninth actuation of the lever 83, the cam surface 142 moves the latch 130 upwardly against the action of spring 133, as shown in FIGURE 8. When the lever 83 is returned to normal position, and the portion 141 accordingly moved downwardly, as shown in FIGURE 9, the notch 145 at the lower end of the latch 130 is moved into engagement with the end portion 140 of the detent 48, this being effected by spring 133.

When the lever 83 is actuated the ninth time preparatory to the marking of bundle No. 10, the segment 54 is advanced to bring the zero numeral on the first bundle print type wheel to the print line position. Because the tail piece 116 of pawl 110 is also engaged with the segment 56, that segment is advanced one step to bring the numeral 1 on the segment 55 to the print line position for printing the numeral 10 on the identification tag for bundle No. 10.

Upon the tenth actuation of lever 83, the tooth 92 of pawl 90 does not engage a ratchet tooth 93 because the inner edge surface of the segment 53 is relieved, as at 150, FIGURE 5. Accordingly, upon the tenth actuation of the lever 83, the first type wheel is not advanced.

Figure 11:
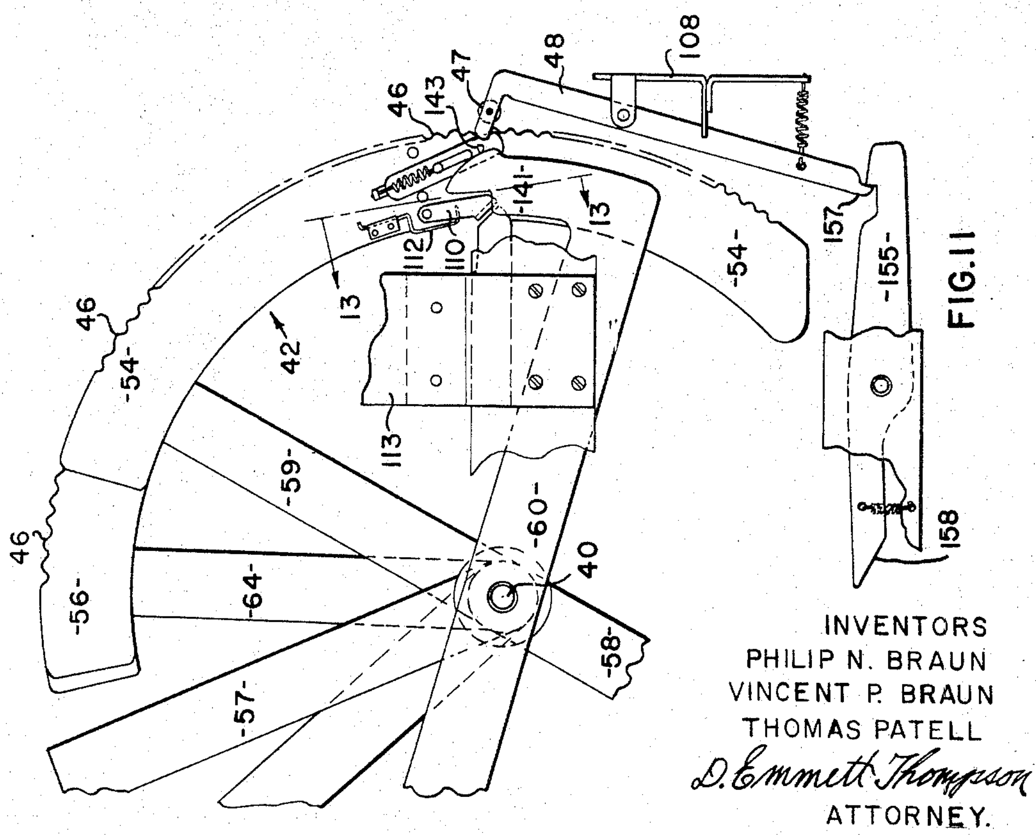
FIGURE 11 is a view showing the structure in FIGURES 8 and 9 with the type wheels in the position shown in said figures and the actuator advanced by the tenth actuation and the first wheel detent disengaged.

As shown in FIGURE 9, at the conclusion of the ninth actuation and the descent of the cam 142, the notch 145 of latch 130 is moved into engagement with the end 140 of detent 48. With actuation number 9, the cam 142 is moved upwardly into engagement with the pin or projection 143 on latch 130, camming the latch and the detent 48 outwardly, as shown in FIGURE 11. This moves the roller 47 out of engagement with the notches 46, permitting the first type wheel to return to normal position under the influence of spring 103, positioning the numeral 1 on the first type wheel at the print line for the marking of bundle 11. This makes certain detent 48 remains out of engagement with segment 54 until the first print wheel is returned to normal position, a pivoted latch 155 is provided for latching the lower end 157 to the detent, see FIGURE 11. When the first type wheel is returned to normal position by spring 103, the forward end 158 of latch 155 is cammed upward by a notch 159 in brace 58, see FIGURE 5, thereby releasing the detent 48.

The next nine bundles are marked in, and upon the marking of bundle 19, the second type wheel is advanced another step to bring the numeral 2 thereon at the print line for marking bundle 20. Upon the next succeeding actuation, the detent 48 is moved outwardly to permit the first type wheel to return to normal position for the marking of bundle 21. It will be apparent that with this arrangement, the marking machine will mark ninety-nine consecutive bundles.

The marking machine in general is of the type shown in Patent No. 2,825,480, or may be of the type shown in Patent No. 2,796,607. The general arrangement of the print type wheels is shown in Patent No. 2,598,438. The marking machine is supplied with a roll of tape 170, see FIGURE 1. Upon each operation of the marking machine, the tape 170 is advanced to a print station indicated at 171, the tape being pressed against the type wheels by a print platen 172. The garment is placed over the platen 173 and the platen moved upwardly toward the tag attaching means 175, which, as shown in FIGURE 1, is a heating iron for heat sealing the tag to the garment. The surface of the tag confronting the garment being provided with a thermoplastic coating. If the machine is of the type shown in Patent No. 2,796,607, the attaching means 175 would consist of a stapler which functions to staple the tag on the garment. During the initial upward movement of the garment platen 173, a switch, not shown, is actuated to energize a solenoid 177, FIGURE 2, to move the printing platen 172 forwardly to press the end portion of the tape 170 against the print type. As the garment platen 173 is moved in proximity to the tag affixing means 175, power means, as a solenoid or cylinder, is connected to the platen arm 180 at 181. The power means is energized by switch 182 closed by arm 183. The platen 173 is then moved by the power means in operative relation with 175 to affix the printed tag to an article, and sever the tag from the tape. The operation of the power means is set forth in Patents 2,796,607, and 2,825,480.

The listing machine 30 has an external appearance somewhat similar to the marking machine 31. The casing of the listing machine includes side plates 190 and a curved top closure 191. The lister has a plurality of print wheels embodying a structural arrangement similar to the number 1 bundle print type wheel in the marking machine. These print wheels are shown in FIGURES 22, 25, 34, 36 and 37. The print wheels include an acuate segment 194 carrying the print type. In FIGURE 40, the print type on the fifth and ninth print wheels, from the left in that figure, have not been advanced from initial or normal position. Each print type block on a print type wheel includes indicia stating a type of article—for example, the wheel at the left end of FIGURE 40 has type bearing the word "socks." The next wheel to the right "handkerchiefs"; the third wheel "towels"; the fourth wheel "undershirts"; the fifth wheel "dresses"; the sixth wheel "pants"; the seventh wheel "pillowcases"; the eighth wheel "sheets," etc.

In the lister structure shown, there are ten wheels to designate ten different articles, however, any desired number of print wheels may be used. The type blocks on each wheel also bear consecutive numerals to indicate the number of each article to be listed.

Each print wheel also has an arcuate detent segment 195 formed at its periphery with notches 196 for engagement by a detent 197 similar to the detent 48 in the marking machine. In both machines, the detents serve to properly position and hold the type at the print line underneath the ribbon 200, FIGURE 40.

Figures 18, 21, 22:
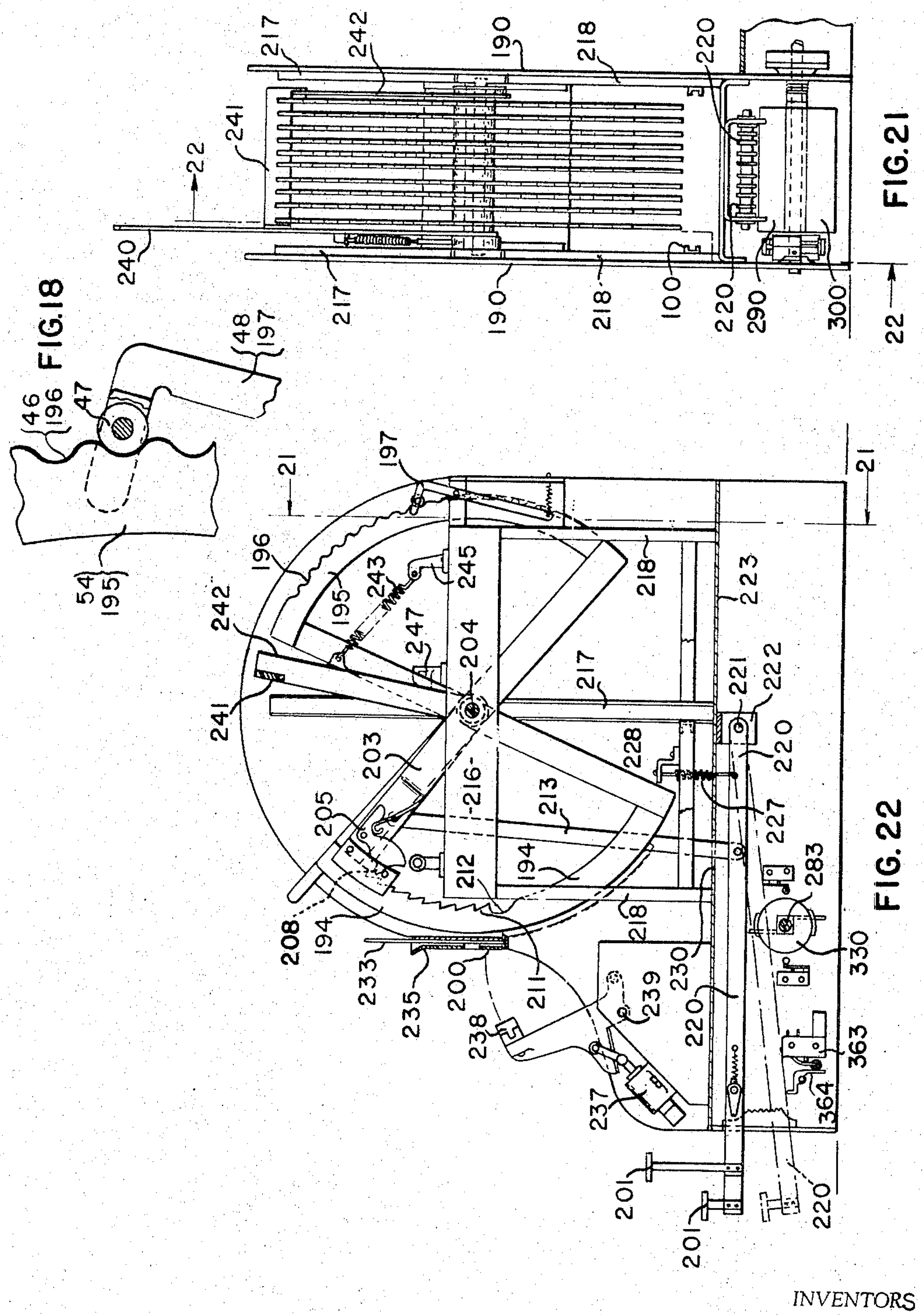
FIGURE 18 is an enlarged fragmentary view of the upper portion of the detent for all of the print type wheels in both the marking and listing machines.
FIGURE 21 is a rear end elevational view taken on a line corresponding to line 21—21, FIGURE 22; the view is looking to the left in FIGURE 22.
FIGURE 22 is a view taken on a line corresponding to line 22—22, FIGURE 21, and including the type wheel detent.
Figure 20:
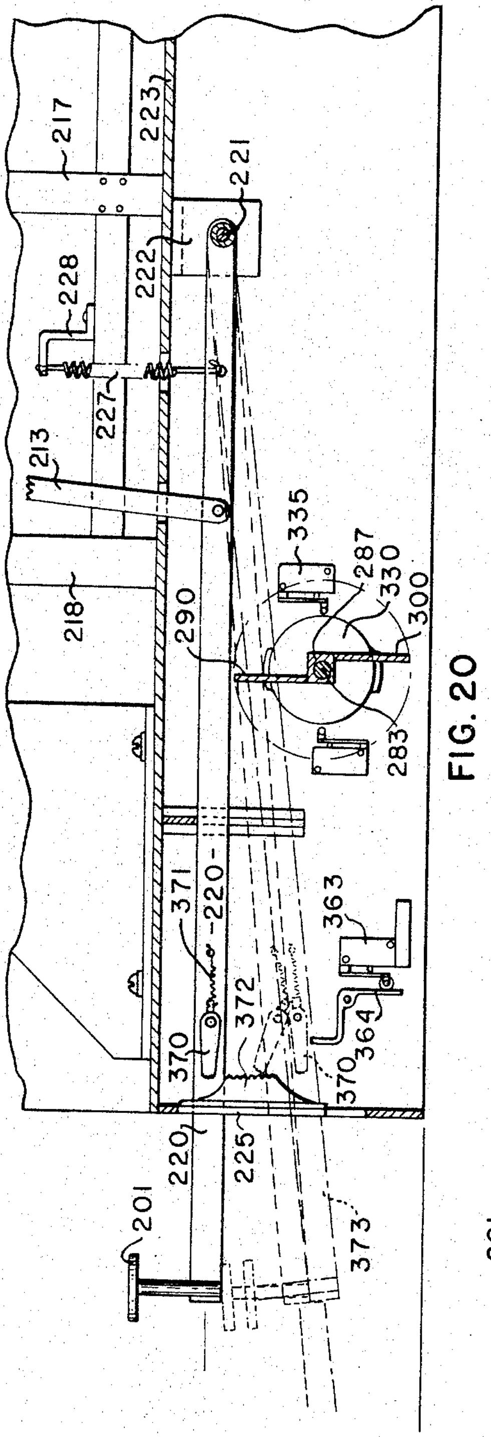
FIGURE 20 is a view taken on line 20—20, FIGURE 19.
Figure 19:
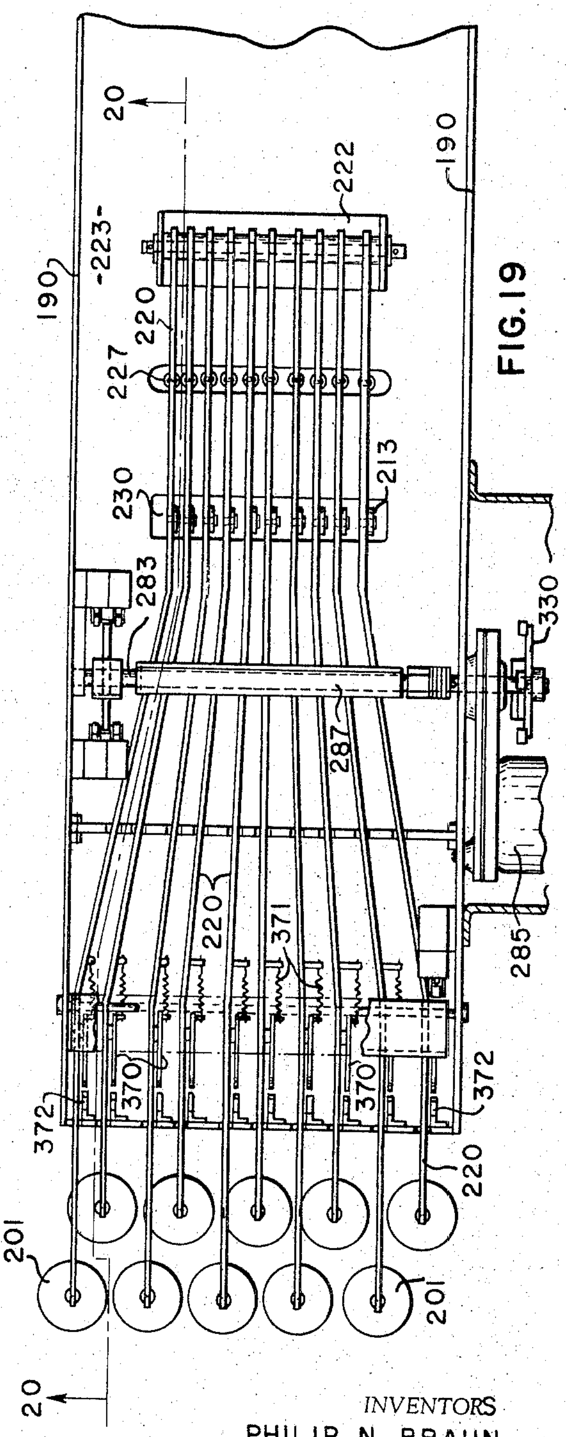
FIGURE 19 is a bottom plan view of the listing machine shown in FIGURE 1.

The print wheels are individually or selectively advanced step by step, by depressing keys 201, shown in FIGURES 1 and 42, and also in FIGURES 19, 20, and 22.

Figures 23, 24, 25:
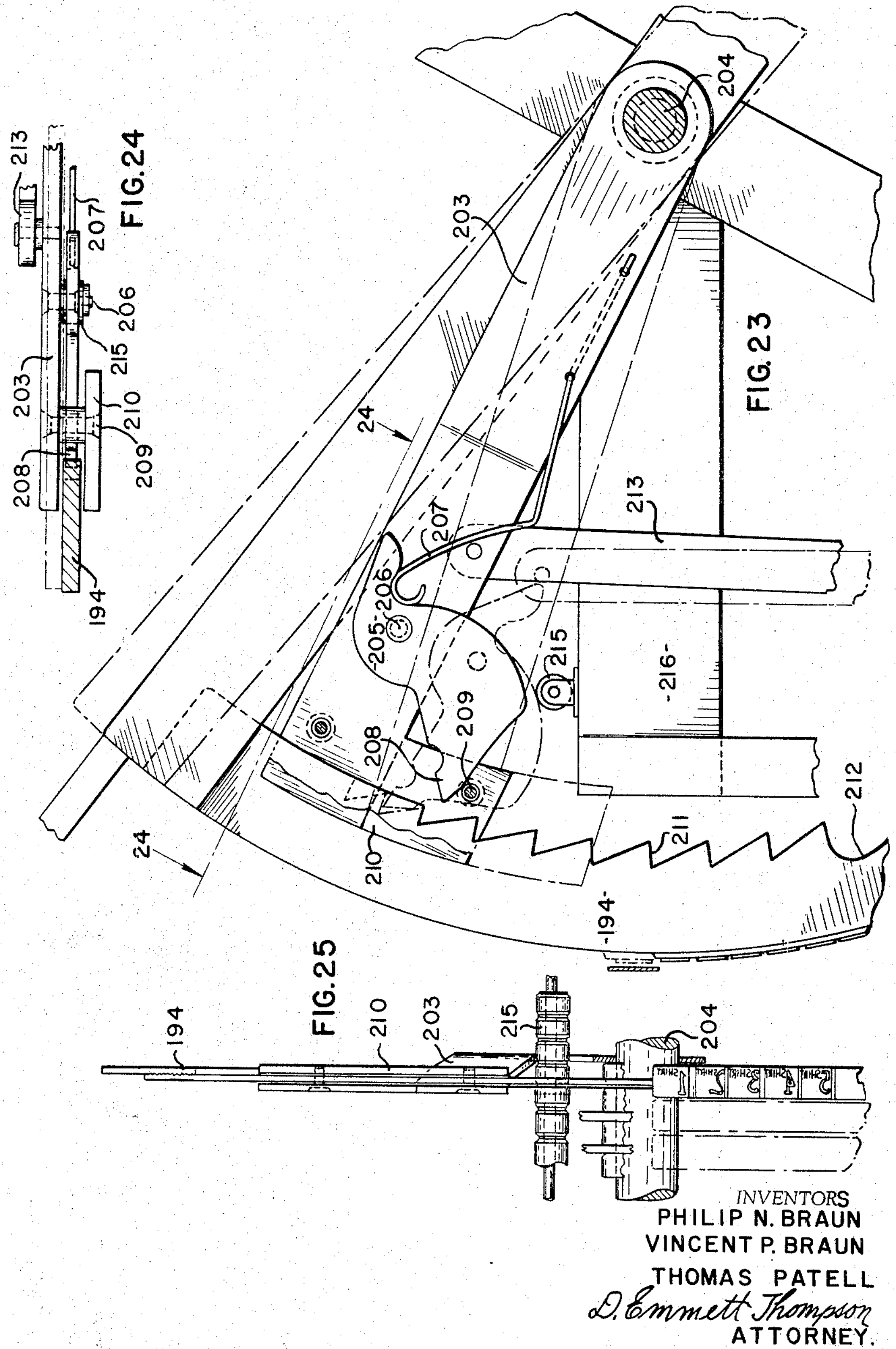
FIGURE 23 is an enlarged fragmentary view of the actuating mechanism for advancing the print type wheels in the lister.
FIGURE 24 is a view taken on line 24—24, FIGURE 23.
FIGURE 25 is a view looking to the right in FIGURE 23.
Figures 26, 27, 28:
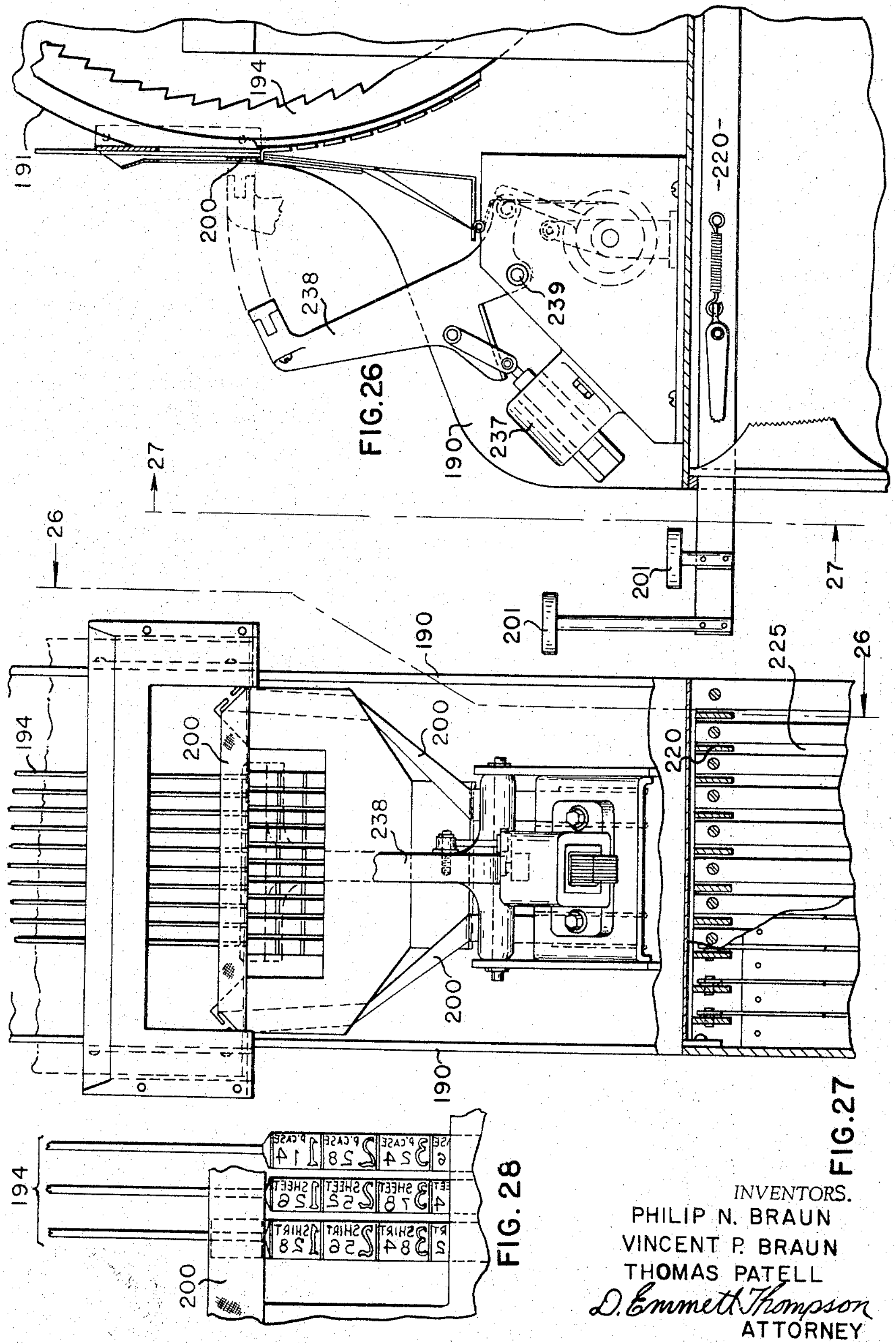
FIGURE 26 is a view taken on the line 26—26, FIGURE 27.
FIGURE 27 is a view looking to the right, FIGURE 26, as indicated by the line 27—27.
FIGURE 28 is an enlarged face view of three of the print type wheels appearing in the upper central portion of FIGURE 27.

Associated with each type wheel there is an actuating member in the form of a lever 203, FIGURE 23, pivotally mounted at one end on a shaft 204. All of the type wheels are rotatably mounted on the shaft 204. A feed pawl 205 is pivotally mounted on a pin 206 carried by the arm 203. This pawl is similar in structure and contour to the pawl 90 in the marking machine. It is urged in a counter-clockwise direction by a spring 207 maintaining the toothed end 208 against a stop pin 209 which also serves as a rivet to attach a side plate 210 to the arm 203. The cam 205 is positioned in registration with the type carrying segment 194 of the print wheel.

The inner edge of the segment 194 is formed with a series of ratchet teeth 211 which terminates in a relieved portion, or large notch, 212, see FIGURE 23. The arm 203 is moved downwardly by a link 213. Downward movement of the arm moves the under side edge of the cam 205 into engagement with a roller 215 mounted on a cross member 216. The cross member is supported by centrally located channel posts 217, and at its end by posts 218, see FIGURE 22. Upon movement of the cam 205 into engagement with the roller 215, clockwise rotation is imparted to the cam about the pin 206, causing the toothed end 208 to engage one of the notches 211 and advance the type print wheel one step.

Referring to FIGURES 20 and 22, the lower end of each link 213 is pivotally connected to a key lever 220. These levers are pivoted on a rod 221 mounted in a bracket 222 depending from the top wall 223 of the base.

The levers 220 extend forwardly through vertically arranged slots 225 in the front wall of the base, and each lever is provided with one of the keys 201. Each of the levers 220 is yieldingly maintained in up position by a tension spring 227 attached to each lever 220 and to a fixed cross member 228, which also serves as a stop for the print wheels when they are in normal, or non-printing position, see FIGURES 20 and 22. The links 213 extend upwardly from the levers through an aperture 230 formed in the top wall 223 of the base.

It will be apparent from the description above that the operator will depress a key 201 for the listing of each article in the bundle. For example, referring to FIGURES 40 and 41, the print wheels have been advanced to print a list on an invoice 233 showing the following articles in the bundle. 6 socks, 5 handkerchiefs, 4 towels, 3 undershirts, 2 pants, 4 pillowcases, 2 sheets. The print type, in addition to indicating the kind of article and the number thereof, may also include print indicia, such as $.42 for the 6 sheets. When the articles in the bundle have been all listed, the invoice 233 is positioned in a holder 235, see FIGURE 22, and a solenoid 237 is energized to move a print platen 238 upwardly about the pivot 239 to move the invoice against the ribbon 200 to make the impression on the invoice according to the setting of the type on the print wheels.

Following the printing of the invoice, the type wheels are all returned to normal, or non-printing position, by operation of a print wheel clearance member. This member consists of a lever 240 mounted on the wheel supporting shaft 204 and extending radially thereof exteriorly of the top casing of the listing machine. A cross member 241 is affixed to the lever 240 and is positioned to engage the rear or upper edges of all of the type segments 194. The opposite end of the cross member 241 is fixed to an arm 242 which is also pivotally mounted on the shaft 204.

The lever 240 is maintained in the position shown in FIGURE 34 by a tension spring 243 affixed at one end to the lever 242, and at its opposite end to a bracket 245 fixed to a cross member 216. The arm 242 is held against a stop 247 by the spring 243. During the first forward movement of the lever 240, a switch 248 is actuated by a link 249 pivotally mounted intermediate its ends, as at 250, on a bracket 251 affixed to the lever 240. The forward end of the link 249 is restrained against clockwise movement by a stop 253 whereby, during forward movement of the clearance lever 240, the switch 248 is actuated, see FIGURES 34 and 39. Upon the return movement of the arm 240, the link 249 is permitted to pivot in a clockwise direction and not operate the switch 248. The link 249 is urged toward the stop 253 by a weight 255.

Figures 36, 37, 38, 39:
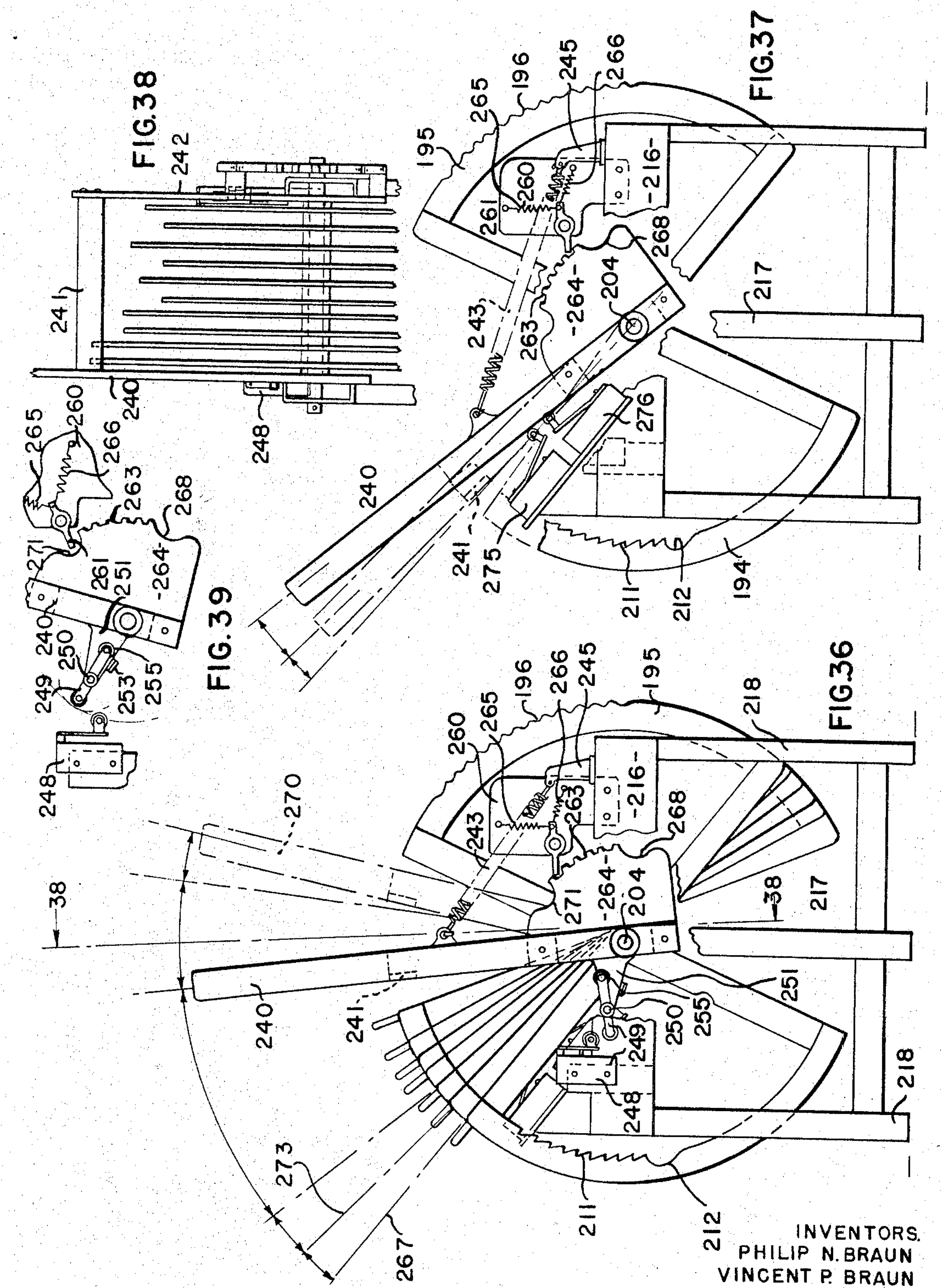
FIGURE 36 is a view similar to FIGURE 34 with the type wheel clearance lever advanced slightly past the printing position.
FIGURE 37 is a view similar to FIGURE 36 with the print switch removed and showing the interlock switches and with the print wheel returning handle approaching type wheel resetting position.
FIGURE 38 is a view taken on a line corresponding to line 38—38, FIGURE 36.
FIGURE 39 is a fragmentary view of the print switch operating mechanism and the full stroke mechanism for the print wheel clearance member.

A full stroke mechanism is provided and is effective to prevent return movement of the lever 240 after it has been moved to the full line position, FIGURE 36, for actuation of the print switch 248. This mechanism consists of a plate 260 attached to the cross piece 216. A pawl 261, FIGURES 36, 37 and 39 is pivotally mounted on the plate 260 and has a forwardly extending portion arranged to engage notches 263 formed on the arcuate shaped rear edge of a plate 264 secured to the lever 240. The pawl 261 has a rearwardly extending portion to which a vertically disposed tension spring 265 is attached, and a second tension spring 266 is also attached to the rearwardly extending portion of the pawl, this spring inclining downwardly. These springs 265, 266, yieldingly hold the pawl in horizontal position, in which position the pawl is effective to engage the notches 263 to prevent retrograde movement of the lever 240. When the lever 240 has been moved to the bottom position indicated by the line 267, FIGURE 36, to return all of the type to non-print position, the end of the pawl is in registration with a large notch 268 in plate 264. Upon reverse movement of the lever 240, the pawl is moved in a counter-clockwise direction about its pivot and then ratchets over the teeth 263. When the lever is in full position, as indicated in dotted outline 270, the pawl is in registration with the large notch 271 at the upper end of the series of notches 263, and upon forward movement of the lever 240, the pawl is again moved to the horizontal position to prevent retrograde movement of the lever.

When the clearance lever 240 approaches the end of its clearance stroke, indicated by the dotted dash lines 273, FIGURE 36, the lever engages and operates switches 275, 276.

In the operation of listing and marking the articles, in the laundry bundle, the operator adjusts the indicia print wheels of the marking machine to the proper position for printing the identifying indicia on the tags to be attached to the articles. The operator then places the invoice 233 over the tag affixing means 171 and operates the marking machine to affix a tag to the invoice. The invoice is then positioned in the holder 235 on the listing machine. The tag attached to the invoice positioned in the holder 235, FIGURE 1, is indicated at 280. This operation of the marking machine renders the listing machine operable and renders the marking machine inoperable. Accordingly, the next operation performed is the listing of the first article in the bundle, which is done by simply depressing the correct key 201 on the listing machine. Actuation of this key renders the listing machine inoperable and the marking machine operable. Accordingly, the operator then attaches an identification tag to the article that has been listed and in so doing renders the marking machine inoperable and the listing machine operable, ready for the listing of the second article in the bundle. These operations are repeated until all of the articles in the bundle have been listed and an identification tag attached to each article. The operator now pulls the lever 240 downwardly and, as previously explained, the first portion of this movement actuates the switch 248 to supply power to the print platen 238 to print the list on the invoice. This operation of printing the list on the invoice renders the listing machine inoperable and the marking machine operable and, also, energizes the motor 67 to effect advancement of the first bundle number print wheel in the marking machine to the next position, preparatory to the listing and marking of the next bundle.

Figure 29:
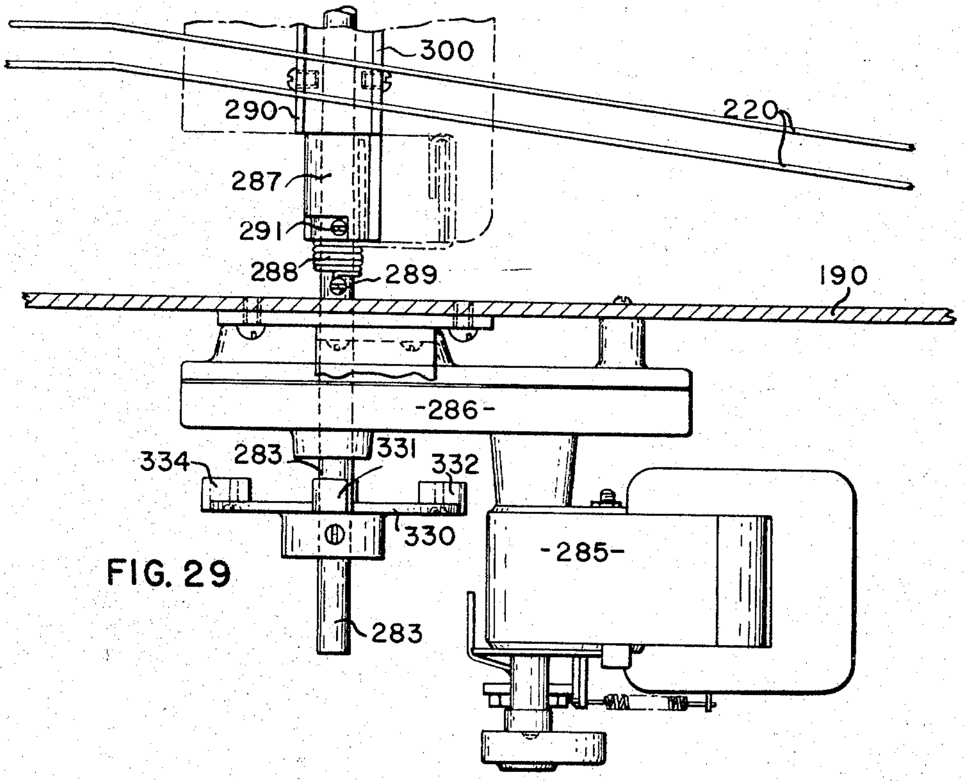
FIGURE 29 is an enlarged top plan view of the motor for operating the key lever locking mechanism, and contiguous portions of said mechanism; the line 29—29, FIGURE 30, orientating the view.
Figure 30:
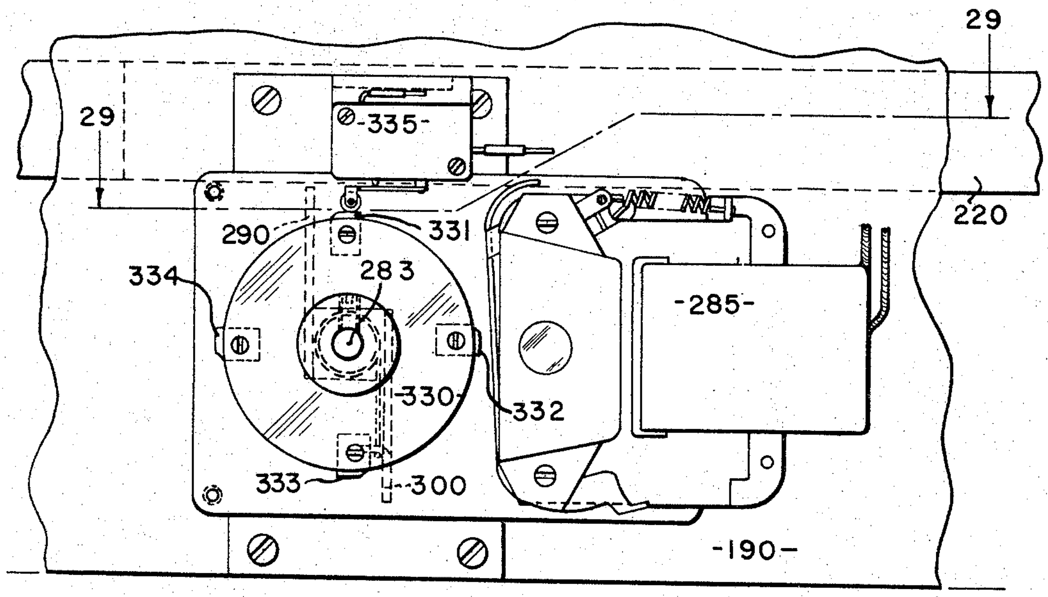
FIGURE 30 is an end view looking upwardly in FIGURE 29.

A shaft 283 is journalled at its ends in the side plates 190 of the lister and extends transversely in the base portion thereof below the key levers 220. This shaft is operatively connected to a motor 285, FIGURE 29, by means of gearing arranged in a casing 286. The intermediate portion of this shaft carries a sleeve 287, which is affixed to the shaft by a torsion spring 288, one end of which is fixed to the shaft as by screw 289, and the opposite end is attached to a blade 290 carried by the sleeve. The spring acts to yieldingly rotate the sleeve 287 against a stop screw 291 mounted in the shaft, see FIGURE 31.

There is a second blade 300 affixed to the sleeve and extending therefrom in direction opposite to the sleeve 290. The arrangement is such that when the blades 290, 300, are disposed in vertical position, the upper edge of the upper blade is positioned in close adjacency to the key levers 220 when they are in the upper position, as shown in FIGURE 20.

Figure 45:
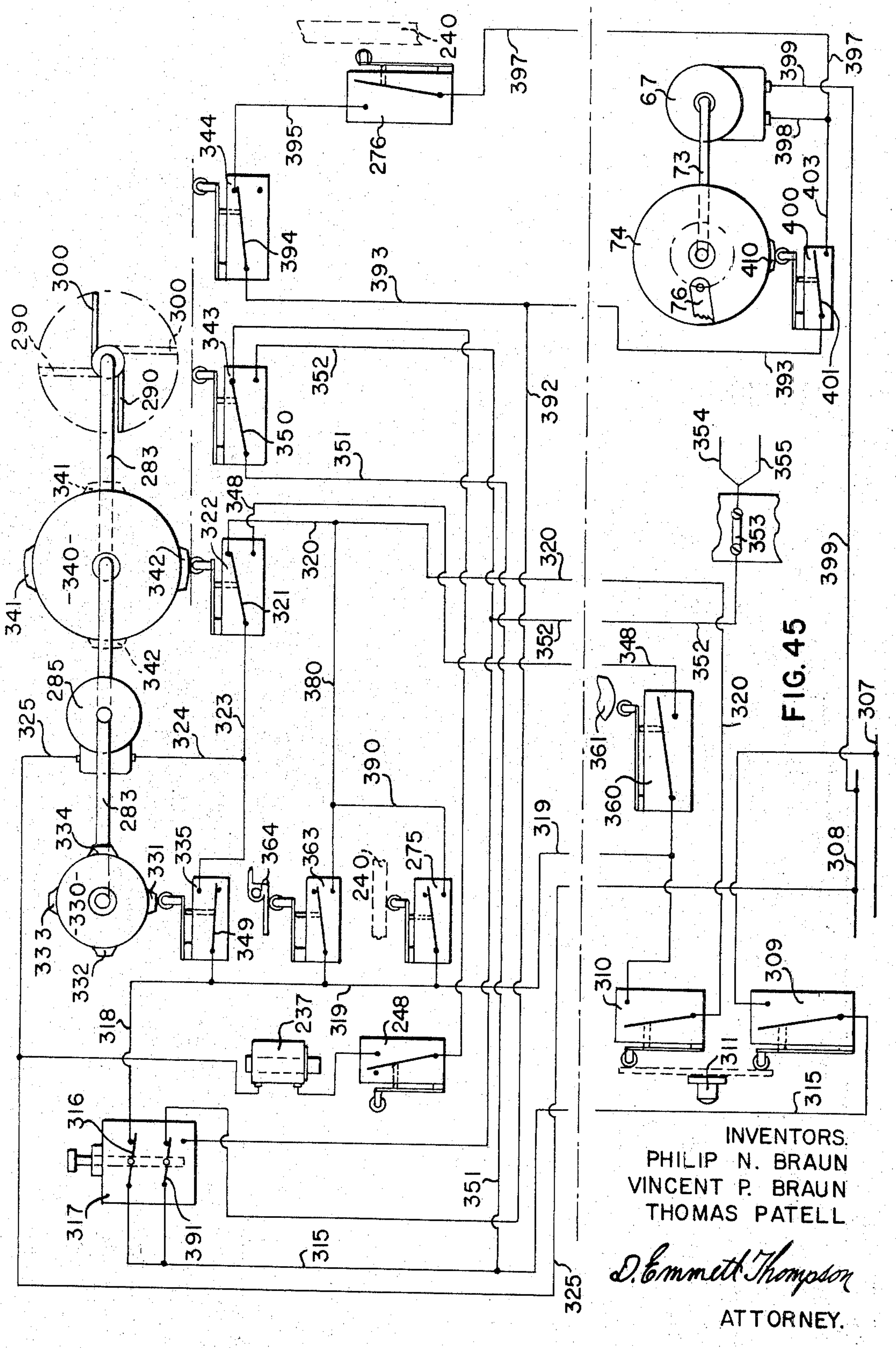
FIGURE 45 is a schematic wiring diagram of the control circuitry for interlocking the lister and marking machines.

Referring to the diagram, FIGURE 45, the blades 290, 300, are shown in full line moved out of key locking position. The power source is indicated at 307, 308. Switches 309, 310, are closed by operation of the actuator 311 and remain closed until another operation of the actuator 311. With these switches closed, a circuit extends from side 307 through switch 309, wire 315, through closed contacts 316 of selector switch 317, wires 318, 319, through closed switch 310, wire 320, contact 321 of switch 322, wires 323, 324, motor 285, wire 25 to the opposite side 308.

The motor 285 effects one quarter of a revolution of shaft 283. There is a disk 330 fixed to one end of the motor shaft 283. The disk is provided with four actuators 331, 332, 333, 334, for actuating the switch 335.

Figures 31, 33:
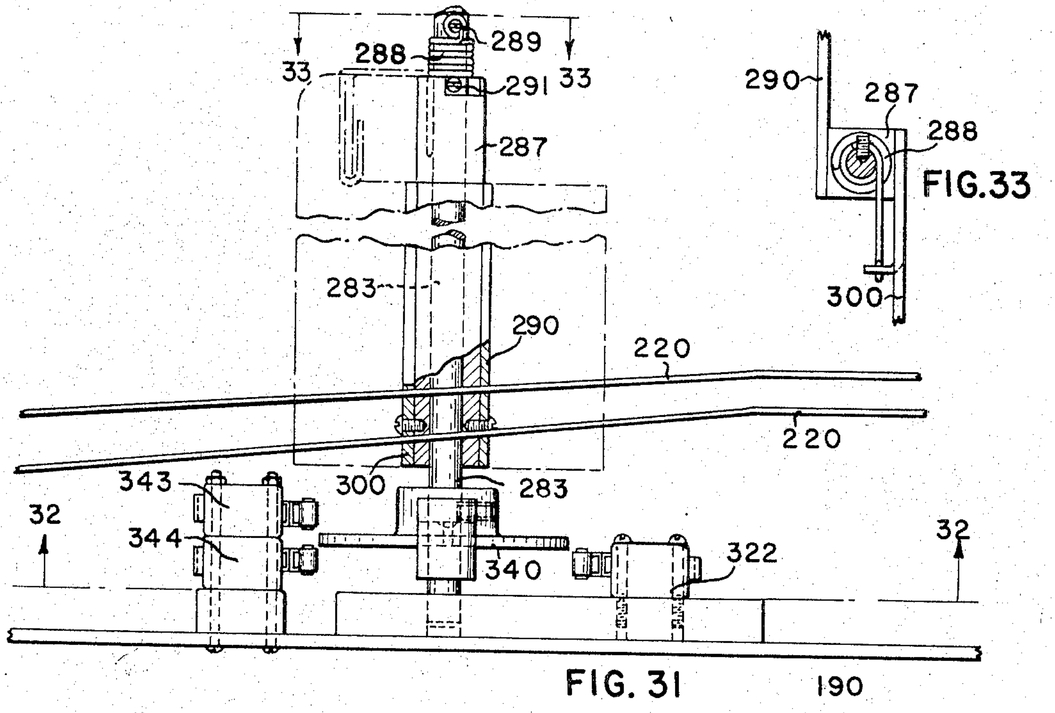
FIGURE 31 is a view corresponding to FIGURE 29 showing the mechanism at the opposite end of the lister key lever lock mechanism.
FIGURE 33 is a view taken on line 33—33, FIGURE 31.
Figure 32:
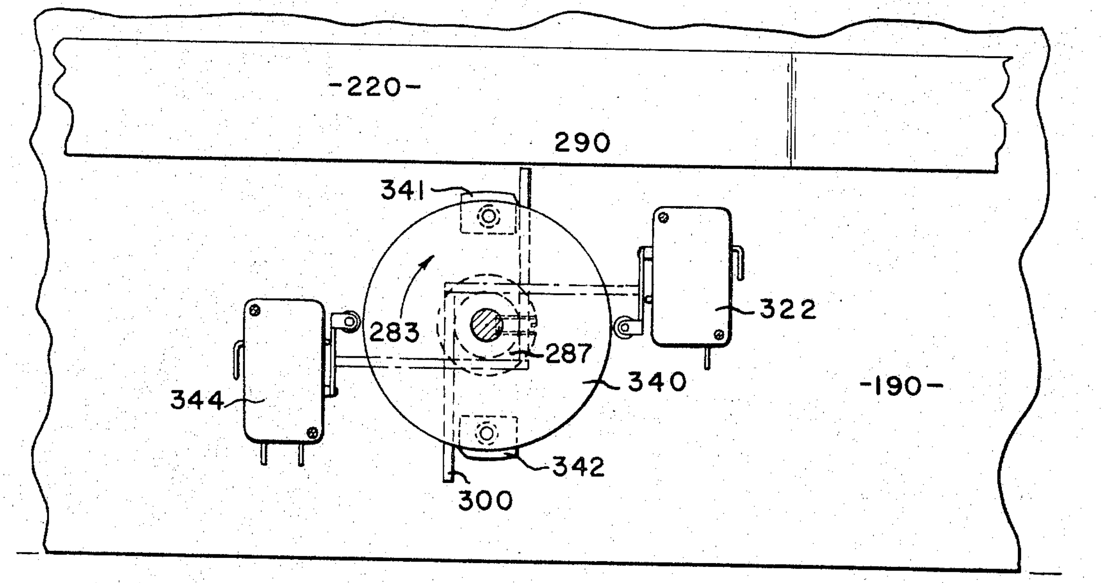
FIGURE 32 is a view taken on line 32—32, FIGURE 31.

There is a disk 340 fixed at the opposite end of the shaft and it carries actuators 341, 342, FIGURES 31, 32. The actuators 341, 342, are arranged at diametrically opposite sides of the disk 340 and serve to simultaneously operate the switch 322 and switches 343, 344.

As the motor 285 starts to rotate the shaft 283, the actuator 342 moves out of engagement with the actuator of switch 322 permitting contact 321 to open the circuit between wires 320 and 323, and permitting the contact 321 thereof to engage the contact to which wire 348 is connected. Simultaneously, the actuator 331 on the disk 330 moves out of engagement with switch 335, permitting the contact 349 thereof to connect wire 318 with wire 323 to provide continuous power to the motor 285. It will be observed that the circumferential length of the actuators 331, 332, 333, 334, is less than those of the actuators 341, 342.

When the shaft 283 has made a quarter revolution, the actuator 334 moves contact 349 of switch 335 to interrupt the power supply to the wires 323, 324, and the motor stops. At this time, the actuators 341, 342, have been moved to the dotted line positions shown in FIGURE 45. This results in the contact 350 of switch 343 being shifted to complete a circuit from wire 351, which is connected to the wire 315, to the wire 352. This wire extends to the terminal 353 providing power to the wires 354, 355, which extend to the print solenoid 177 and operating switch 182 of the marking machine, rendering that machine operable. Also, during this quarter revolution of the shaft 283, the blade 290 has been moved to vertical position, FIGURE 20, locking the key levers 220 against downward movement. This means that the marking machine can be operated to affix an identification tag to the invoice.

Upon operating the marking machine for that purpose, switch 360 is operated by the cam 361, see FIGURE 1, to provide power from the wire 319 to wire 348, which is now connected through the contact 321 of switch 322 to wire 323 to again provide power for the motor 285.

The motor 285 will continue to operate through switch 335, as previously explained, for another quarter revolution of the shaft 283 to move the locking blade 290 out of key locking position and to move the actuator 341 on disk 340 to again effect actuation of the switches 322, 343, 344. This means that contact 350 of switch 343 has broken the circuit to wire 352 which, as previously explained, furnishes power to wires 354, 355, to the marking machine and accordingly, the marking machine is rendered inoperable.

The first article of the bundle can now be listed by depressing one of the keys 201. A switch 263 is mounted in the base of the lister and is actuated by a bell crank member 364, see FIGURE 20, when any one of the key levers 220 is depressed to the full downward movement.

A full stroke mechanism is also provided on each of the lister key levers 220. This is in the form of a pawl 370, FIGURE 20. There is one of these pawls pivotally mounted on each lever 220. The pawl is yieldingly maintained in position parallel to the lever by a tension spring 371. Each pawl 370 is arranged to engage the ratchet teeth on a member 372, the pawl serving to prevent upward movement of the lever 220 until it has descended to the lowermost position shown in dotted line at 373, FIGURE 20, at which time it will have actuated the switch 363 and the pawl 370 will have moved underneath the member 372 to permit the pawl to swing in a counterclockwise direction and ratchet over the teeth of the member 372 during upward return movement of the lever under the influence of spring 227.

This operation of the switch 363 completes a circuit from wire 319 to wires 380, 320, contact 321, wires 323, 324, to again energize the motor 285 to effect another quarter revolution of the shaft 283 to bring the locking blade 300 into locking position under the key levers 220, and to move the contact 350 to energize wire 352 to render the marking machine operable.

The marking machine is then operated to attach an identification tag to the first listed article. It will be apparent from the previous description that this operation of the marking machine through actuation of switch 360 again effects energization of the motor 285 to effect rotation of the shaft 283 to deenergize the marking machine and to move the locking blade out of locking position so that the next article can be listed by depressing one of the keys on the listing machine.

These operations are repeated for each article in the bundle. When all of the articles in the bundle have been thus listed and marked, the clearance lever 240, FIGURES 34, 36 and 37, is moved forwardly and downwardly. As previously explained, the first part of this movement effects operation of the switch 248 to energize the print solenoid 237 for impressing the bundle list on the invoice 233. As the lever 240 approaches its full downward stroke, as shown in FIGURE 37, switches 275 and 276 are closed. This actuation of switch 275 establishes a circuit from wire 319, through wires 390, 380, 320, contact 321, wires 323, 324, to motor 285 to effect rotation of shaft 283 to permit contact 350 to complete a circuit to wire 352 to again provide power to the marking machine. It will be remembered that upon each actuation of the marking machine, the same is rendered inoperable by actuation of switch 360, but the resetting of all of the lister print wheels by the lever 240 to normal or non-print condition, again renders the marking machine operable by the operation of the switch 275.

The simultaneous operation of switch 276 by the clearance lever 240 establishes a circuit from the supply line 315, through closed contacts 391 of switch 317, wire 392, wire 393, contact 394 of switch 344, wire 395, closed switch 276, wires 397, 398 to motor 67, the opposite side of which is connected by wire 399 to the side 308.

As previously explained, the motor 67 effects rotation of the crank disk 74 to advance the first bundle number wheel of the marking machine to the next position, preparatory to marking in the articles of the next bundle. The last movement of the shaft 283 also moves one of the locking blades 290, 300, into locking position under the lister key levers 220, whereby the next operation performed by the operator must be the attachment of a tag, showing the new bundle number, to the next invoice.

It is believed to be apparent from the above description of the marking and listing machines and the interlock circuitry therebetween, we have devised a system and apparatus which requires the operator to perform a series of operations in a predetermined sequence, which results in error proof listing and marking the articles in a bundle of laundry.

What we claim is:

1. In a system for listing and marking articles in a bundle of laundry, including a listing machine having type positioning means operable to position print type to printing position to print indicia relative to the kinds of articles in the bundle, and including means for printing on an invoice or the like such indicia, and a marking machine having a plurality of print type wheels, each movable from a normal position to a selected printing position for printing an identification indicia on an identification tag, one of said print wheels having type for printing the bundle number, said marking machine having tag affixing means operable to affix a printed tag to an article, the combination of an interlock for rendering said marking machine inoperable following the affixing of a tag to an article, and rendering said listing machine operable for listing another article and upon listing of said other article to render said listing machine inoperable, and said marking machine operable, and means operable upon printing the list to advance said bundle number type wheels to a different position.

2. In a system for marking articles in a bundle of laundry, including a listing machine having type positioning means operable to position print type to a print line to print indicia relative to the kinds of articles in the bundle, and including means for printing on an invoice or the like such indicia, and a marking machine having a plurality of print type wheels, each movable from a normal position to a selected printing position for printing an identification indicia on an identification tag, one of said print wheels having type for printing the bundle number, power actuating means operable when energized to advance said bundle number type wheel from one position to the next, the combination of an interlock for rendering said marking machine inoperable following the affixing of a tag to an article and rendering said listing machine operable for listing another article, and upon listing of said other article to render said listing machine inoperable and said marking machine operable, and means operable upon printing the list to energize said power means and render said marking machine operable.

3. In a system for listing and marking articles in a bundle of laundry, including a listing machine having type movable to a print line according to the number of each kind of article in the bundle, and including means for printing on an invoice or the like the totals of the articles listed, and a marking machine having a plurality of print type wheels, each movable from a normal position to a selected printing position for printing an identification indicia on an identification tag, and including a bundle number print wheel having type for printing the bundle number on said tag, spring means urging said bundle number print wheel to normal position, detent means for restraining said bundle number print wheel against movement by said spring, power actuating means operable when energized to advance said bundle number print wheel from one position to the next and being operable when said bundle number print wheel has been advanced to a predetermined position to release said detent to permit said spring to return said bundle number print wheel to normal position, the combination of an interlock for rendering said marking machine inoperable following each fixation of a tag to an article and rendering said listing machine operable for listing another article, and upon listing of said other article to render said listing machine inoperable and said marking machine operable, and means operable upon the printing of the list to energize said power means and render said marking machine operable.

4. A laundry marking machine including a marking machine having print type wheels separately movable to a print line for printing an identification indicia on an identification tag, said marking machine having separately movable first and second bundle number print type wheels, ratchet and pawl mechanism, and power means for operating the same to move said first bundle number type wheel into successive positions, means operable upon said first bundle number print type wheel being moved to a predetermined position to advance said second bundle number print wheel one step, spring means for returning said first bundle number print wheel to normal position, a detent operable to restrain movement of said first bundle number print wheel by said spring, said ratchet and pawl mechanism being operable, upon actuation by said power means, when said second bundle number print wheel has been advanced to move said detent out of restraining position.

5. A laundry marking machine having print type wheels separately movable to a print line for printing an identification indicia on an identification tag, said marking machine having first and second bundle number print type wheels, ratchet and pawl mechanism operable upon each actuation to advance said first bundle number type wheel from normal non-printing position step by step, a latch carried by said first bundle number print type wheel and being movable into engagement with said second bundle number type wheel when said first bundle number type wheel has been advanced to a predetermined position for advancing said second bundle number type wheel upon the next successive advancement of said first bundle number type wheel, spring means for urging said first bundle number type wheel to normal position, a detent engaging said first bundle number type wheel and restraining the same against movement by said spring, said ratchet and pawl mechanism including a cam member for moving said detent out of engagement with said first bundle number type wheel upon said next successive movement, and means operable when said first bundle number type wheel has been returned to normal position to move said detent into engagement with said first bundle number type wheel.

6. A laundry marking machine as set forth in claim 5, including means for holding said detent out of engagement with said first bundle number type wheel until the same is returned to normal position.

7. A laundry marking machine as defined in claim 5, including a second latch member movable into latching engagement with said detent when the same is moved out of engagement with said first bundle number print wheel and being movable out of engagement with said detent when said first bundle number print wheel has returned to normal position.

8. A laundry marking machine having indicia print type wheels separately movable to a print line for printing identification indicia on an identification tag, said marking machine also having first and second bundle number print type wheels, ratchet and pawl mechanism operable upon each actuation to advance first bundle number type wheel one step, a latch carried by said first bundle number print type wheel and being movable into engagement with said second bundle number print type wheel when said first bundle number print type wheel has been advanced to a predetermined position, and said latch being operable to advance said second bundle number print type wheel upon the next successive advancement of said first bundle print type wheel, spring means for urging said first bundle number print type wheel to normal position, a detent for engaging said first bundle number print type wheel to restrain the same against movement by said spring, a second latch carried by said first bundle number print type wheel for engagement with said detent when said first bundle number print type wheel has been advanced to said predetermined position, said ratchet and pawl mechanism including a cam member movable into engagement with said second latch upon said next successive advancement of said first bundle number print type wheel to move said detent out of engagement with said first bundle number print type wheel.

9. In a system for listing and marking articles in a bundle of laundry, including a listing machine having a plurality of print type wheels, each movable step by step to position type to a print line for listing the number of a kind of article, print wheel advancing mechanism associated with each print wheel and including a key lever operable upon depression to advance the associated print type wheel one step, a locking bar common to all of said levers and movable into and out of lever locking position, and a marking machine having power means operable when energized to affix a printed identification tag to an article, a circuit for energizing said power means, including a switch movable to closed position upon depression of any of said key levers, means operable upon the closing of said switch to move said locking bar into locking position, and means operable upon operation of said marking machine to move said locking bar out of key lever locking position and to open the circuit to said marking machine.

10. In a system for listing and marking articles in a bundle of laundry, including a listing machine having a plurality of print type wheels, each movable step by step to position type to a print line for listing the number of a kind of article, print wheel advancing mechanism associated with each print wheel, including a key lever operable upon depression to advance the associated print type wheel one step, a locking bar common to all of said levers and movable into and out of lever locking position, and a marking machine having means when operable to affix a printed identification tag to an article, the combination of an interlock operable upon each actuation of a key lever in said listing machine to move said locking bar into locking position and to render said marking machine operable, and upon operation of said marking machine, to render said marking machine inoperable and to move said locking bar out of locking position.

11. A machine for listing articles in a bundle of laundry, a plurality of print type wheels, each separately movable step by step to position type to a print line for listing the number of a kind of article, print type wheel advancing mechanism associated with each print type wheel, including a key lever operable upon depression to advance the associated print type wheel one step, a shaft journalled in said listing machine and extending transversely below said key levers and being provided with a bar extending lengthwise of said shaft, power means operable upon depression of a key lever for rotating said shaft to position said bar in locking position to all of said key levers.

12. A machine for listing articles in a bundle of laundry, a plurality of print type wheels, each of said wheels being separately movable step by step to position type to a print line for listing the number of a kind of article, print type wheel advancing mechanism associated with each print type wheel and including a key lever operable upon depression to advance the associated print type wheel one step, a shaft journalled in said listing machine and extending transversely below said key levers and being provided with a key lever locking bar extending lengthwise of the shaft, power means operable upon successive energizations for rotating said shaft to move said bar into and out of locking position to all of said key levers, a switch movable to closed position upon depression of any one of said key levers to energize said power means for moving said bar into locking position, and a second switch movable to closed position to effect successive energization of said power means to move said bar out of locking position.

13. A listing machine as set forth in claim 12, wherein each key lever is provided with a full stroke mechanism.

14. In a system for listing and marking articles in a bundle of laundry, including a marking machine having power actuated means operable when energized to attach an identification tag to an article, a listing machine having a plurality of type print wheels, each separately movable from a normal position to a print line for indicating the number of each kind of article listed, a print wheel return member operable to return all of said print type wheels to normal non-printing position, means operable upon the initial movement of said return member to print on an invoice or the like the totals of the articles listed, a switch operable by said return member upon the initial movement thereof for energizing said print means, a second switch operable upon the completion of movement of said return member to energize said marking machine and render said listing machine inoperable.

15. An arrangement as set forth in claim 14 wherein said return member is provided with a full stroke mechanism.

References Cited

UNITED STATES PATENTS

| | | | |
|---|---|---|---|
| 2,528,740 | 11/1950 | Caruthers et al. | 101—95 |
| 2,849,934 | 9/1958 | Braun | 93—88 |
| 3,095,787 | 7/1963 | Cornwell et al. | 93—88 |

BERNARD STICKNEY, *Primary Examiner.*